United States Patent
Gyanchandani et al.

(10) Patent No.: US 11,393,462 B1
(45) Date of Patent: Jul. 19, 2022

(54) SYSTEM TO CHARACTERIZE VOCAL PRESENTATION

(71) Applicant: AMAZON TECHNOLOGIES, INC., Seattle, WA (US)

(72) Inventors: Narendra Gyanchandani, Sammamish, WA (US); Bilyana Slavova, Redmond, WA (US); Daniel Kenneth Bone, Somerville, MA (US); Hanhan Wang, Seattle, WA (US); Njenga Kariuki, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 136 days.

(21) Appl. No.: 15/931,343

(22) Filed: May 13, 2020

(51) Int. Cl.
*G10L 15/22* (2006.01)
*G10L 15/02* (2006.01)
*G10L 15/06* (2013.01)

(52) U.S. Cl.
CPC .............. *G10L 15/22* (2013.01); *G10L 15/02* (2013.01); *G10L 15/063* (2013.01); *G10L 2015/0631* (2013.01); *G10L 2015/0636* (2013.01)

(58) Field of Classification Search
CPC ....... G06N 20/00; G06F 40/30; G06F 40/279; G06F 40/20; G06F 40/205; G06F 40/56; G06F 16/248; G06F 16/285; G06F 16/245; G06F 16/2455; G06F 16/24575; G06F 16/24578; G06F 16/3329; G06F 17/18; G06F 2203/011; G06F 3/04847; G06F 40/40; G10L 25/63; G10L 15/22; G10L 15/26; G10L 25/30; G10L 15/08; G10L 13/00; G10L 15/02; G10L 15/063; G10L 2015/0631; G10L 2015/0636
See application file for complete search history.

(56) References Cited

U.S. PATENT DOCUMENTS

| | | | | |
|---|---|---|---|---|
| 9,792,279 | B2 * | 10/2017 | Kim | G06F 40/35 |
| 9,812,151 | B1 * | 11/2017 | Amini | G10L 15/26 |
| 10,777,199 | B2 * | 9/2020 | Komori | G06F 16/3329 |
| 10,909,328 | B2 * | 2/2021 | Takano | A61B 5/165 |
| 11,113,335 | B2 * | 9/2021 | Abe | G06F 40/35 |
| 2002/0194002 | A1 * | 12/2002 | Petrushin | G10L 17/26 704/270 |
| 2005/0105712 | A1 * | 5/2005 | Williams | G10L 13/027 704/275 |
| 2010/0179811 | A1 * | 7/2010 | Gupta | G10L 15/22 704/235 |
| 2014/0236596 | A1 * | 8/2014 | Martinez | G06F 40/30 704/235 |

(Continued)

*Primary Examiner* — Linda Wong
(74) *Attorney, Agent, or Firm* — Lindauer Law, PLLC

(57) ABSTRACT

A device with a microphone acquires audio data of a user's speech. That speech comprises utterances, that together comprise a session. The audio data is processed to determine sentiment data indicative of perceived emotional content of the speech as conveyed by individual utterances of the user. That information is then used to determine the emotional content of the session. For example, the information may include several words describing the overall and outlying emotions of the session. Numeric metrics may also be determined, such as activation and valence. A user interface may present the words and metrics to the user. The user may use this information to assess their state of mind, facilitate interactions with others, and so forth.

23 Claims, 8 Drawing Sheets

(56) References Cited

U.S. PATENT DOCUMENTS

| | | | | |
|---|---|---|---|---|
| 2016/0063993 | A1* | 3/2016 | Dolan | G06F 16/00 |
| | | | | 704/254 |
| 2016/0162807 | A1* | 6/2016 | Smailagic | G10L 25/63 |
| | | | | 706/12 |
| 2016/0210279 | A1* | 7/2016 | Kim | G06F 40/30 |
| 2016/0210962 | A1* | 7/2016 | Kim | G06F 40/274 |
| 2016/0379643 | A1* | 12/2016 | Ito | G10L 25/51 |
| | | | | 704/270.1 |
| 2018/0032610 | A1* | 2/2018 | Cameron | G06F 40/284 |
| 2018/0032611 | A1* | 2/2018 | Cameron | G06K 9/723 |
| 2018/0144761 | A1* | 5/2018 | Amini | G06T 13/40 |
| 2018/0226071 | A1* | 8/2018 | Winter | H04M 3/5183 |
| 2019/0074004 | A1* | 3/2019 | Hashimoto | G10L 15/22 |
| 2019/0138599 | A1* | 5/2019 | Sen | G06F 40/253 |
| 2019/0288973 | A1* | 9/2019 | Liu | H04L 51/32 |
| 2019/0356779 | A1* | 11/2019 | Zimmerman | G10L 15/1815 |
| 2019/0379791 | A1* | 12/2019 | Winter | G06F 40/30 |
| 2020/0053030 | A1* | 2/2020 | Moskowitz | H04L 51/046 |
| 2020/0065376 | A1* | 2/2020 | DeLuca | H04L 51/26 |
| 2020/0125805 | A1* | 4/2020 | Woofers | G06F 40/35 |
| 2020/0175973 | A1* | 6/2020 | Bender | G10L 15/22 |
| 2020/0265464 | A1* | 8/2020 | Jo | G06Q 30/02 |
| 2020/0274838 | A1* | 8/2020 | Hildebrand | H04L 51/12 |
| 2020/0279023 | A1* | 9/2020 | Starks | G06N 20/00 |
| 2020/0342895 | A1* | 10/2020 | Jung | G06K 9/00718 |
| 2020/0357396 | A1* | 11/2020 | Fujii | F24F 11/526 |
| 2021/0043208 | A1* | 2/2021 | Luan | G06F 16/90332 |
| 2021/0050033 | A1* | 2/2021 | Bui | G06N 3/08 |
| 2021/0104245 | A1* | 4/2021 | Aguilar Alas | G06F 40/30 |
| 2021/0271713 | A1* | 9/2021 | Vasconcelos | G06F 40/35 |
| 2021/0272584 | A1* | 9/2021 | McAlpine | A63F 13/87 |

* cited by examiner

SYSTEM TO CHARACTERIZE VOCAL PRESENTATION

BACKGROUND

Participants in a conversation may be affected by the emotional state of one another as perceived by their voice. For example, if a speaker is excited a listener may perceive that excitement in their speech. However, a speaker may not be aware of the emotional state that may be perceived by others as conveyed by their speech.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
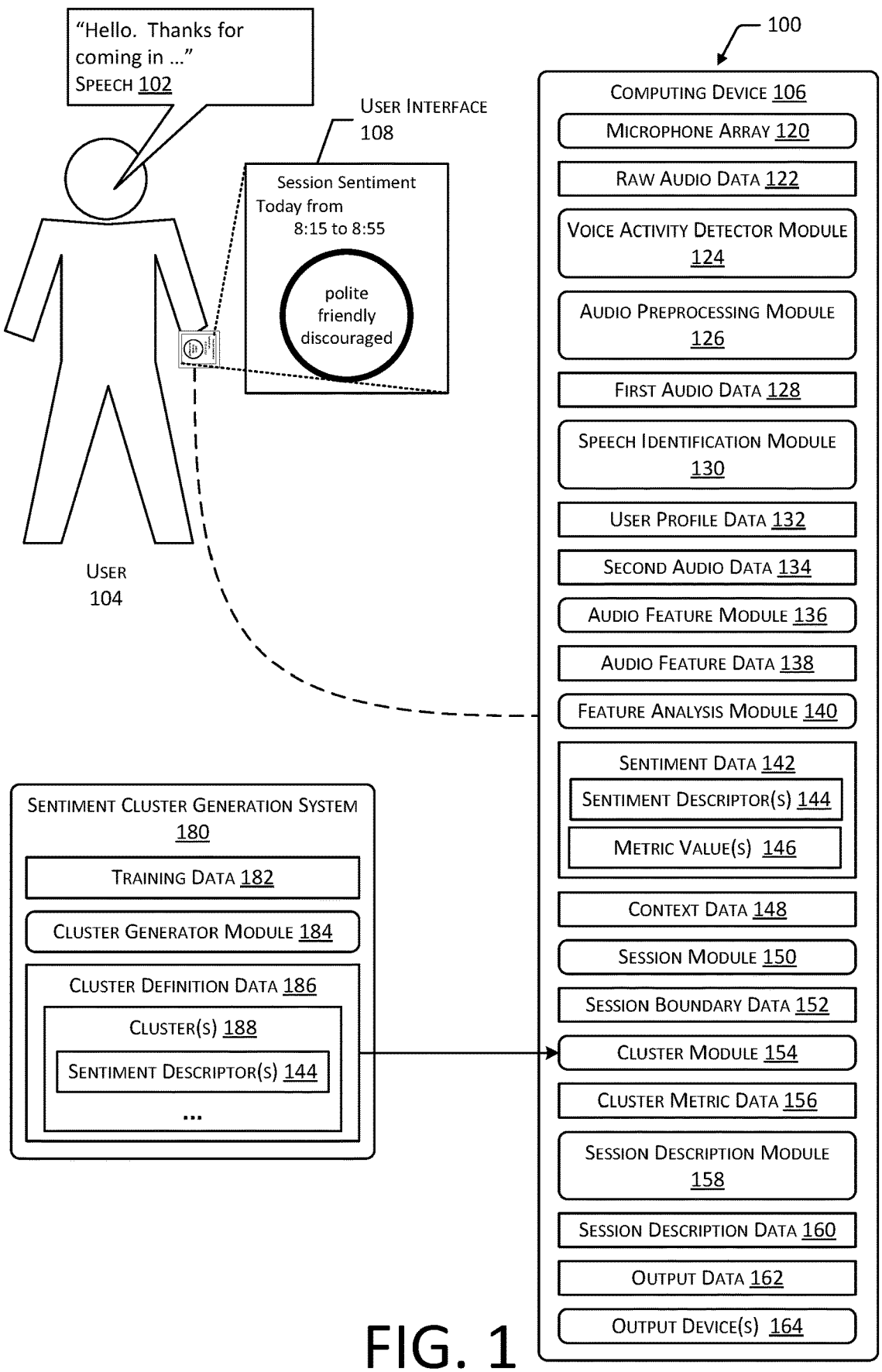
FIG. 1 is an illustrative system that processes speech of a user to determine a session and provide a session description that is indicative of an emotional state as conveyed by the speech, according to one implementation.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A person's wellbeing and emotional state are interrelated. A poor emotional state can directly impact a person's health, just as an illness or other health event may impact a person's emotional state. A person's emotional state may also impact others that they communicate with. For example, a person who speaks with someone in an angry tone may produce in that listener an anxious emotional response.

Information about the emotional state that they are expressing may be useful to help a person adjust their behavior. Continuing the earlier example, if the angry person is speaking to their friend, the friend may let them know. With that awareness, the angry person may then be able to modify their behavior. As useful as this feedback is, it is infeasible to have a friend constantly present who is able to tell a person what the emotional state expressed in their voice is.

Described in this disclosure is a system that processes audio data of a user's speech during a session to determine a session description indicative of emotional state during that session. The session description may then be presented as output in a user interface to the user.

Before use, the user authorizes the system to process their speech. For example, the user may enroll to use the system, and consent to acquisition and processing of audio of the enrolled user's speech. Raw audio as acquired from one or more microphones is processed to provide audio data that is associated with the enrolled user. The speech acquired comprises a plurality of individual utterances. An utterance may comprise a phrase or sentence of spoken words, filler sounds, and so forth that is separated from another phrase by some minimum interval of time. This audio data is then processed to determine audio feature data for these individual utterances. For example, the audio feature data may be processed by a neural network to generate feature vectors representative of the audio data and changes in the audio data.

The audio feature data is then processed to determine sentiment data for that utterance of the enrolled user. For example, the system discards audio data that is not associated with the enrolled user and generates the audio feature data from the audio data that is associated with the enrolled user. After the audio feature data is generated, the audio data of the enrolled user may be discarded.

Utterances may be relatively short in duration, extending from fractions of a second to perhaps a few seconds for a long phrase. The presentation of sentiment data associated with individual utterances is useful. This usefulness may be increased by summarizing the sentiment of the utterances from the enrolled user that have been obtained over a longer span of time rather than an individual utterance. The utterances within a particular interval of time are grouped into a session.

A session may be delineated based on one or more different factors. Input from the enrolled user may be received and used to indicate the start and stop of a session. For example, the user may press a button on a wearable device to indicate start/stop of a session. Location data may be used to designate the start and stop of a session. For example, if the user moves from their office to a conference room, a session may be designated as the time spent from their entry to that conference room until their exit. Calendar data may be used to determine a session. For example, if the enrolled user has a meeting scheduled from 8 am until 9 am, that period of time may be designated as a single session. Proximity data may also be used to determine a session. For example, if the enrolled user is determined to be near another person, a session may be designated for the time while they were in proximity to one another. In other implementations other techniques may be used to delineate the start time and end time of the session. Different sessions may have different durations. For example, a first session based on proximity may last a few minutes while the enrolled user speaks to another person while a second session based on a scheduled meeting may last hours.

The sentiment data associated with at least a portion of the utterances in the session are processed to determine a session description. The session description provides an overall summary of the sentiment during that session. The session description may comprise a set of sentiment descriptors such as words, metric values, and so forth. For example, the session description may comprise a set of three words such as "polite, friendly, discouraged".

To determine the session description, the sentiment data is processed to allocate the sentiment data for particular utterances to clusters. Cluster definition data associates particular sentiment descriptors with particular clusters in a sentiment space. For example, the sentiment descriptors "friendly, amused, silly, happy, . . . " may be associated with a particular cluster or grouping. The sentiment descriptors within a cluster may be deemed to be approximately equivalent to one another.

During processing of the session, the sentiment descriptors associated with the utterances are associated with particular clusters. For example, each sentiment descriptor for each utterance is associated with a single cluster. A count of utterances associated with each cluster is then calculated. In one implementation, clusters that contain less than a threshold count are discarded from further consideration. Of the remaining clusters, the cluster having a greatest count is selected as a first cluster. A second cluster may be selected based on a count that is next greatest. An outlier cluster may then be selected. For example, a sentiment distance between the first cluster and the other clusters in a sentiment space may be determined. The cluster at the greatest sentiment distance from the first cluster may be designated as the outlier cluster.

With the first cluster, second cluster, and outlier cluster selected, the session description may be determined. In one implementation, for each of these selected clusters, a sentiment descriptor having the greatest frequency is determined. The session description may comprise these three sentiment descriptors. In other implementations, other techniques may be used to determine the session description.

By determining a session and the corresponding session description, the system provides a substantially improved user interface. Compared to the sentiment data for individual utterances, the session description provides a simplified and more usable set of information for the user to consider. This information is simpler and faster for the user to consider, improving the user's ability to assess their performance and adjust future behavior. As a result, the user is better able to improve their overall wellness.

Illustrative System

FIG. 1 is an illustrative system 100 that processes speech 102 of a user 104 to determine a session and provide a session description that is indicative of an emotional state as conveyed by the speech 102, according to one implementation.

The user 104 may have one or more computing devices 106 on or about their person. The computing device 106 may be implemented in various physical form factors including, but not limited to, the following: wearable devices, smartphones, tablets, laptop computers, network enabled devices, voice activated devices, and so forth. In this illustration, the computing device 106 is depicted as a tablet. In some implementations a wearable device may be used in conjunction with the computing device 106. For example, the wearable device may comprise one or more microphones and provide audio data to the computing device 106.

The computing device 106 may present a user interface 108. The user interface 108 may be a graphical user interface (GUI) as shown here, a voice user interface (VUI), tactile user interface, and so forth.

Speech 102 by the user 104 is detected by a microphone array 120 of the computing device 106 and raw audio data 122 may be acquired. In other implementations raw audio data 122 may be acquired from other devices, such as a wearable device.

A voice activity detector module 124 may be used to process the raw audio data 122 and determine if speech 102 is present. For example, the microphone array 120 may obtain raw audio data 122 that contains ambient noises such as machinery, wind, and so forth. Raw audio data 122 that is not deemed to contain speech 102 may be discarded.

The voice activity detector module 124 may use one or more techniques to determine voice activity. For example, characteristics of the signals present in the raw audio data 122 such as frequency, energy, zero-crossing rate, and so forth may be analyzed with respect to threshold values to determine characteristics that are deemed likely to be human speech. The voice activity detector module 124 may generate data that is indicative of individual utterances within the raw audio data 122. For example, speech sounds may be divided into utterances based on how long a non-speech interval is between determined voice activity. A non-speech interval that is greater than a threshold time, such as 350 milliseconds (ms), indicates a start of a next utterance.

Once at least a portion of the raw audio data 122 has been determined to contain speech 102, an audio preprocessing module 126 may further process this portion to determine first audio data 128. In some implementations, the audio preprocessing module 126 may apply one or more of a beamforming algorithm, noise reduction algorithms, filters, and so forth to determine the first audio data 128. For example, the audio preprocessing module 126 may use a beamforming algorithm to provide directivity or gain and improve the signal to noise ratio (SNR) of the speech 102 from the user 104 with respect to speech 102 or noise from other sources.

A speech identification module 130 may be used to determine that an utterance was spoken by the user 104. The speech identification module 130 may access user profile data 132 to determine if the first audio data 128 is associated with the user 104. For example, user profile data 132 may comprise information about speech 102 provided by the user 104 during an enrollment process. During enrollment, the user 104 may provide a sample of their speech 102 which is then processed to determine features that may be used to identify if speech 102 is likely to be from that user 104. In some implementations the speech identification module 130 may provide a confidence level that is indicative of a likelihood that the utterance is associated with the user 104.

Second audio data 134 is determined that comprises the portion(s) of the first audio data 128 that is determined to be speech 102 from the user 104. For example, the second audio data 134 may consist of the speech 102 which exhibits a confidence level greater than a threshold confidence value of 0.95. As a result, the second audio data 134 omits speech 102 from other sources, such as someone who is in conversation with the user 104.

An audio feature module 136 uses the second audio data 134 to determine audio feature data 138. For example, the audio feature module 136 may use one or more systems such as signal analysis, classifiers, neural networks, and so forth to generate the audio feature data 138. The audio feature data 138 may comprise values, vectors, and so forth. For example, the audio feature module 136 may use a convolutional neural network that accepts as input the second audio data 134 and provides as output vectors in a vector space. The audio feature data 138 may be representative of features such as rising pitch over time, speech cadence, energy intensity per phoneme, duration of a turn, and so forth.

A feature analysis module 140 uses the audio feature data 138 to determine sentiment data 142. Human speech involves a complex interplay of biological systems on the part of the person speaking. These biological systems are affected by the physical and emotional state of the person. As a result, the speech 102 of the user 104 may exhibit changes. For example, a person who is calm sounds different from a person who is excited. This may be described as "emotional prosody" and is separate from the meaning of the words used. For example, in some implementations the feature analysis module 140 may use the audio feature data 138 to assess emotional prosody without assessment of the actual content of the words used.

The feature analysis module 140 determines the sentiment data 142 that is indicative of a possible emotional state of the user 104 based on the audio feature data 138. The feature analysis module 140 may determine various values that are deemed to be representative of emotional state. In some implementations these values may be representative of emotional primitives. (See Kehrein, Roland. (2002). The prosody of authentic emotions. 27. 10.1055/s-2003-40251.) For example, the emotional primitives may include valence, activation, and dominance. A valence value may be determined that is representative of a particular change in pitch of the user's voice over time. Certain valence values indicative of particular changes in pitch may be associated with certain emotional states. An activation value may be determined that is representative of pace of the user's speech over time. As with valence values, certain activation values may be associated with certain emotional states. A dominance value may be determined that is representative of rise and fall patterns of the pitch of the user's voice overtime. As with valence values, certain dominance values may be associated with certain emotional states. Different values of valence, activation, and dominance may correspond to particular emotions. (See Grimm, Michael (2007). Primitives-based evaluation and estimation of emotions in speech. Speech Communication 49 (2007) 787-800.)

Other techniques may be used by the feature analysis module 140. For example, the feature analysis module 140 may determine Mel Frequency Cepstral Coefficients (MFCC) of at least a portion of the second audio data 134. The MFCC may then be used to determine an emotional class associated with the portion. The emotional class may include one or more of angry, happy, sad, or neutral. (See Rozgic, Viktor, et. al, (2012). Emotion Recognition using Acoustic and Lexical Features. 13th Annual Conference of the International Speech Communication Association 2012, INTERSPEECH 2012. 1.)

In other implementations the feature analysis module 140 may include analysis of the words spoken and their meaning. For example, an automated speech recognition (ASR) system may be used to determine the text of the words spoken. This information may then be used to determine the sentiment data 142. For example, presence in the second audio data 134 of words that are associated with a positive connotation, such as compliments or praise, may be used to determine the sentiment data 142. In another example, word stems may be associated with particular sentiment categories. The word stems may be determined using ASR, and the particular sentiment categorizes determined. (See Rozgic, Viktor, et. al, (2012). Emotion Recognition using Acoustic and Lexical Features. 13th Annual Conference of the International Speech Communication Association 2012, INTERSPEECH 2012. 1). Other techniques may be used to determine emotional state based at least in part on the meaning of words spoken by the user 104.

The sentiment data 142 determined by the feature analysis module 140 may be expressed as one or more numeric values, vectors, words, and so forth. For example, the feature analysis module 140 may determine sentiment data 142 comprising one or more sentiment descriptors 144 for a given utterance. These sentiment descriptors 144 may be determined by the feature analysis module 140 directly, such as output from a neural network. The sentiment data 142 may comprise one or more metric values 146. For example, a weighted sum of the valence, activation, and dominance values of an utterance may be used to generate an overall sentiment index or "tone value" or "mood value" for that utterance. In some implementations a plurality of metrics may be determined for a single utterance. For example, a valence value and an activation value may be determined for an utterance.

In one implementation, the sentiment descriptors 144 may comprise words that are associated with particular combinations of metric values 146, such as valence, activation, and dominance values. In some implementations, the sentiment data 142 may comprise one or more vectors in an n-dimensional space. The sentiment data 142 may comprise values that are non-normative. For example, a metric value 146 that is expressed as a negative number may not be representative of an emotion that is considered to be bad.

One or more modules (not shown) may determine context data 148. The context data 148 may comprise information about the user 104, the surrounding environment, the computing device 106, and so forth. The information about the user 104 may comprise information obtained from one or more sensors.

The sensors may include one or more of a button, touch sensor, inertial measurement unit (IMU), photoplethysmograph, pulse oximeter, electrocardiograph, temperature sensor, location sensor, and forth. The sensors may be internal to the computing device 106 or may be external to the computing device 106 and in communication with the computing device 106. For example, the context data 148 may comprise data indicative of movement of the computing device 106.

The location sensor is configured to provide information indicative of a location. The location may be relative or absolute. For example, a relative location may indicate "kitchen", "bedroom", "conference room", and so forth. In comparison, an absolute location is expressed relative to a reference point or datum, such as a street address, geolocation comprising coordinates indicative of latitude and longitude, grid square, and so forth. The location sensor may include, but is not limited to, radio navigation-based systems such as terrestrial or satellite-based navigational systems. The satellite-based navigation system may include one or more of a Global Positioning System (GPS) receiver, a Global Navigation Satellite System (GLONASS) receiver, a Galileo receiver, a BeiDou Navigation Satellite System (BDS) receiver, an Indian Regional Navigational Satellite System (IRNSS), and so forth. In some implementations, the location sensor may be omitted or operate in conjunction with an external resource such as a cellular network operator providing location information, or Bluetooth beacons.

The context data 148 may also include appointment data such as the user's 104 calendar of scheduled appointments. The appointment data may include one or more of appointment type, appointment subject, appointment location, appointment start time, appointment end time, appointment duration, appointment attendee data, or other data. For example, the appointment attendee data may comprise data indicative of invitees to the appointment.

The context data 148 may also include data from other devices in the surrounding environment. For example, network enabled devices, home automation systems, and so forth may provide information such as whether another person is present in the same room as the user 104, location of different users 104 in a facility, and so forth.

A session module 150 determines session boundary data 152 that is indicative of a start time and a stop time for a session. The session may be considered a contiguous block of time during which utterances occurring within that block of time are deemed to be related to one another. The session boundary data 152 may be expressed as a time value, frame value indicative of a frame of audio data such as the second audio data 134, and so forth.

The session may be delineated based on one or more different factors. The user 104 may press a button, or activate another control, to signal the start time and end time for a session. Location data may be used to specify the start time and end time for a session. For example, if the user 104 moves from their office to a conference room, a session may be designated as the time spent from their entry to that conference room until their exit. Calendar data may also be used to determine a session. For example, if the user 104 has a meeting scheduled from 8 am until 9 am, that interval may be designated as a session. Proximity data may also be used to determine a session. For example, if the user 104 is determined to be near another person, a session may be designated for the time they are proximate to one another. An absence of speech 102 by the user 104 for a threshold interval may also be used to determine a beginning of a session, end of a session, or both. For example, if the threshold interval is five minutes, if no speech 102 from the user 104 is determined for at least five minutes, a current session may be deemed to have ended. Likewise, if speech 102 from the user 104 is determined after at least five minutes of no speech 102 from the user 104, a session may be deemed to have started. In some implementations different threshold periods of time may be used. For example, a first threshold interval of five minutes may be used to determine the end of a session, while a second threshold interval of three minutes may be used to determine the beginning of a session.

Output from the speech identification module 130 may be used by the session module 150 to determine the session boundary data 152. For example, the speech identification module 130 may provide output indicative of speech 102 by the user 104 and indicative of other people. The output may designate different people are speaking, without necessarily identifying those people. For example, the speech identification module 130 may indicate speech 102 from the user 104, speech from "Person1", speech from "Person2", and so forth. A session may be deemed to begin or end based on the duration of speech by a different or previously undesignated person exceeding a threshold. For example, if the user 104 is speaking with "Person1", and "Person2" joins the conversation, a first session may be concluded and a second session may be designated as starting at the time when "Person2" started speaking.

Sensor data from one or more sensors may be used to determine the start time and end time of the session. For example, accelerometer data acquired by an IMU may be used to determine that the user 104 was walking, stopped walking, then resumed walking later. The time corresponding to being stopped may be designated as a session.

In other implementations other techniques may be used to delineate the start time and end time of the session. These techniques may also be combined. For example, a session may be determined based on location data and proximity data. Different sessions may have different durations. For example, a first session based on proximity may last a few minutes during which the user 104 speaks to another person, while a second session based on a scheduled meeting may last hours.

A cluster module 154 processes the sentiment data 142 associated with a session and generates cluster metric data 156. The session boundary data 152 is indicative of a start time and an end time associated with a session. The sentiment data 142 that is associated with that session is then associated with one or more clusters 188. For example, the sentiment data 142 that is associated with a timestamp between the start time and the end time indicated by the session boundary data 152 is processed by the cluster module 154 to determine cluster metric data 156.

The sentiment data 142 for the utterances in the session are associated with particular clusters 188 that define a region of a sentiment space. Cluster definition data 186 may be provided by a sentiment cluster generation system 180 (described below). The cluster definition data 186 associates one or more sentiment descriptors 144 with a particular cluster 188. The sentiment descriptors 144 within a cluster 188 may be deemed to be approximately equivalent to one another. For example, "friendly" and "happy" may be part of the same cluster 188.

The cluster module 154 of the computing device 106 uses the cluster definition data 186 to associate the sentiment data 142, such as sentiment descriptors 144, for an utterance with a particular cluster 188. For example, the cluster module 154 bins the sentiment descriptors 144 for a session into the clusters 188.

The cluster module 154 determines the cluster metric data 156, such as a count of the number of utterances in each cluster 188. For example, the cluster metric data 156 may indicate that cluster 188(0) has zero associated utterances while cluster 188(9) has three utterances. In other implementations, other operations may be used to determine the cluster metric data 156. For example, if metric values 146 are used, the cluster metric data 156 may be indicative of a sum, average, and so forth.

In some implementations the cluster metric data 156 may also include a sentiment distance in a sentiment space. For example, the cluster metric data 156 may indicate a Euclidean distance in the sentiment space between centers of clusters 188. This sentiment distance may be calculated in advance, and stored in a data structure, such as a lookup table. In some implementations the sentiment distance may be weighted. For example, the cluster metric data 156 for a cluster may comprise the multiplicative product of the sentiment distance between a first cluster 188 and a second cluster 188 as multiplied by a count of the utterances associated with the second cluster 188.

A session description module 158 determines session description data 160 based at least in part on the cluster metric data 156. For example, the cluster 188 that has a greatest count (largest number of utterances) may be selected as a first cluster 188 "M". The cluster 188 that has the next greatest count may be selected as a second cluster 188 "N". An outlier cluster may be determined as well. The selection of the clusters 188 by the session description module 158 is discussed in more detail below.

In one implementation, the sentiment descriptors 144 from each selected cluster that exhibits the greatest frequency of occurrence is selected and used to generate the session description data 160. For example, cluster 188(9) may have a count of 3, cluster 188(8) a count of 2, cluster 188(3) a count of 1, and the rest of the clusters 188 having zero counts. The most frequent sentiment descriptors 144 for each of these clusters 188 may be "polite", "friendly", and "discouraged", respectively. The session description data 160 may comprise these most frequent sentiment descriptors 144. For example, the session description data 160 may indicate that the session was "polite", "friendly", and "discouraged".

The computing device 106 may generate output data 162 from the session description data 160. For example, the output data 162 may comprise hypertext markup language (HTML) instructions that, when processed by a browser engine, generate an image of a graphical user interface (GUI). In another example, the output data 162 may comprise an instruction to play a particular sound, operate a buzzer, or operate a light to present a particular color at a particular intensity.

The output data 162 may then be used to operate one or more output devices 164. Continuing the examples, the GUI may be presented on a display device, a voice user interface may be presented using a speaker, a buzzer may be operated, the light may be illuminated, and so forth to provide output. The output may include the user interface 108, such as the GUI depicted here that provides information about the sentiment for a particular session.

In some implementations session description data 160 may be aggregated to provide information about different intervals of time. Session description data 160 that is associated with a day, week, month, or other interval of time may be used to determine description data for that interval. For example, a top k (where k is a nonzero positive integer) most frequently occurring sentiment descriptors 144 associated with the cluster 188 associated with the greatest number of sessions occurring during a particular day may be selected to represent the sentiment for that day. In another example, metric values 146 such as activation, valence, and so forth may be associated with particular bins. The most frequently occurring bin across all sessions for a day may be determined. The mid-point value of the metric values 146 associated with this bin may be deemed to represent the metric value 146 for that day.

The sentiment cluster generation system 180 may use a set of training data 182 to train a cluster generator module 184. The cluster generator module 184 may comprise a neural network. The training data 182 may be obtained from presenting sample utterances to a human. The human may then assign one or more sentiment descriptors 144 to the sample. The human may also select equivalent or alternative sentiment descriptors 144. The training data 182 may then be used to train the neural network of the cluster generator module 184 to generate the cluster definition data 186 that groups sets of sentiment descriptors 144 in the sentiment space. In other implementations other techniques may be used to associate particular sentiment descriptors 144 with particular clusters 188. For example, the cluster definition data 186 may be specified by a human operator.

It is understood that the various functions, modules, and operations described in this system 100 may be performed by one or more devices. For example, the various modules and functions described with respect to the computing device 106 may be performed at least in part by other devices.

Figure 2:
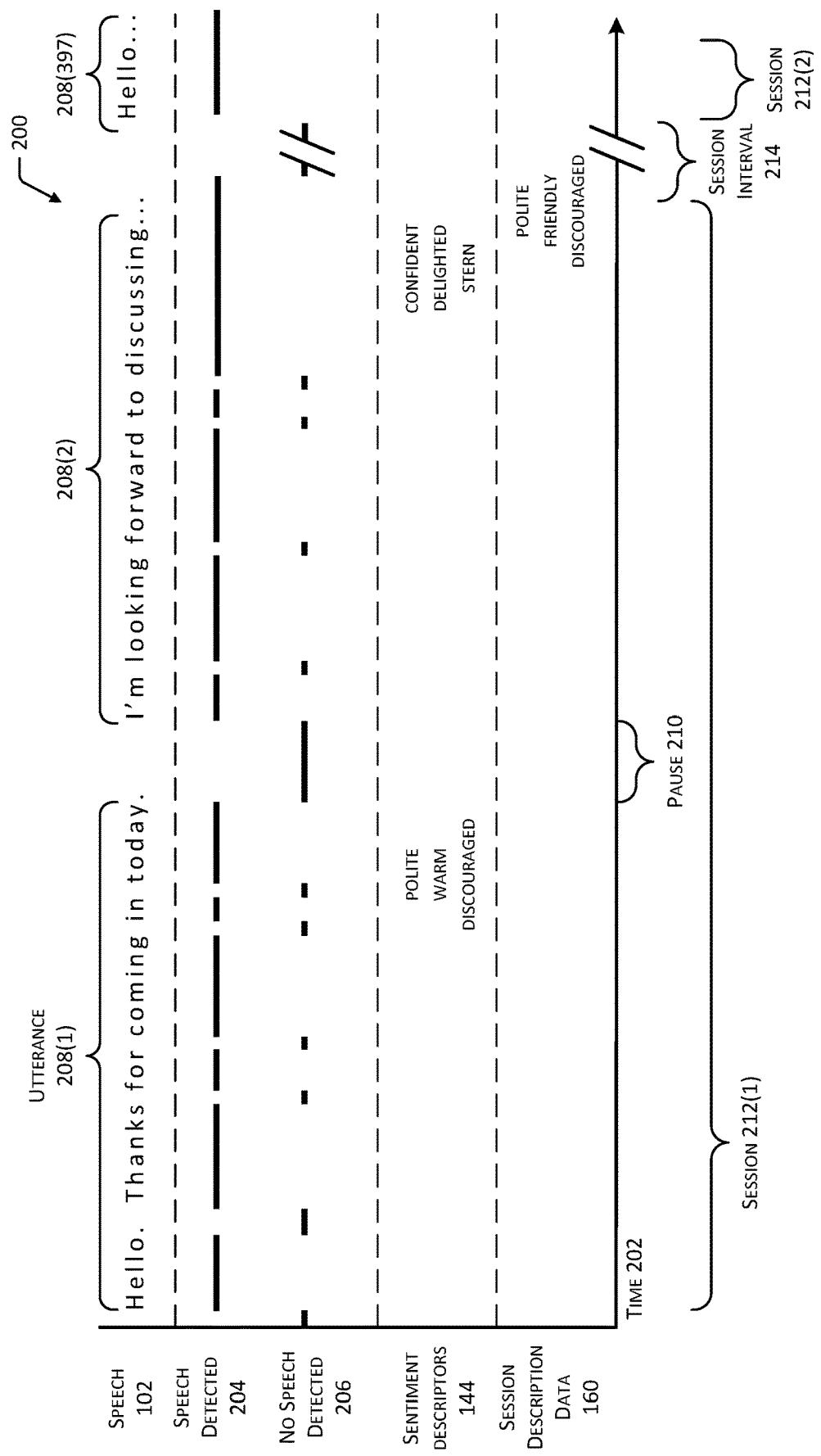
FIG. 2 illustrates speech, sentiment descriptors associated with utterances, a session comprising a plurality of utterances, and the session description, according to one implementation.

FIG. 2 illustrates at 200 speech 102, sentiment descriptors 144 associated with utterances, a session comprising a plurality of utterances, and the session description, according to one implementation.

In this illustration, time 202 increases from left to right. Text corresponding to the speech 102 is depicted. A line graph at 204 indicates times during which speech is detected. Likewise, a line graph at 206 indicates times during which speech is not detected. The voice activity detector module 124 may be used to determine if speech is detected or not.

An utterance 208 may be determined based on the pause 210 or gap between detected speech. A first utterance 208(1) is shown, corresponding to the phrase "Hello. Thanks for coming in today". Also shown is a second utterance 208(2), corresponding to the phrase "I'm looking forward to discussing . . . ". In the implementation shown here, utterances 208(1) and 208(2) are distinguished from one another by a pause 210 that exceeds a threshold time. For example, a time during which no speech is detected 206 that is greater than 350 ms may separate the first utterance 208(1) from the second utterance 208(2). In other implementations, other techniques may be used.

As described above, sentiment data 142, such as sentiment descriptors 144, may be determined for the utterances 208. For example, the first utterance 208(1) is associated with sentiment descriptors 144 of "polite", "warm", and "discouraged". Continuing the example, the second utterance 208(2) is associated with sentiment descriptors 144 of "confident", "delighted", and "stern".

A first session 212(1) and a second session 212(2) are shown. For example, the session module 150 may determine the session boundary data 152 that indicates a start time and an end time for the session 212. For example, the first session 212(1) may be determined based on input from the user 104 activating a control to start the session and end the session. In another example, the second session 212(2) may be determined based on calendar data associated with the user 104.

Session description data 160 is shown for each session 212. For example, the session description data 160 for the first session 212(1) may comprise the sentiment descriptors 144 "polite", "friendly", and "discouraged".

A session interval 214 is also shown, indicating time between the first session 212(1) and the second session 212(2). This session interval 214 may be seconds, hours, days, and so forth. As described above, the session module 150 may determine the session boundary data 152 indicative of one or more of a start or end of the session 212 based on an interval during which no utterances 208 have been detected. For example, if an interval of time of no speech detected 206 exceeds a threshold interval value, such as five minutes, an end of a current session 212 may be deemed to have occurred.

Figure 3:
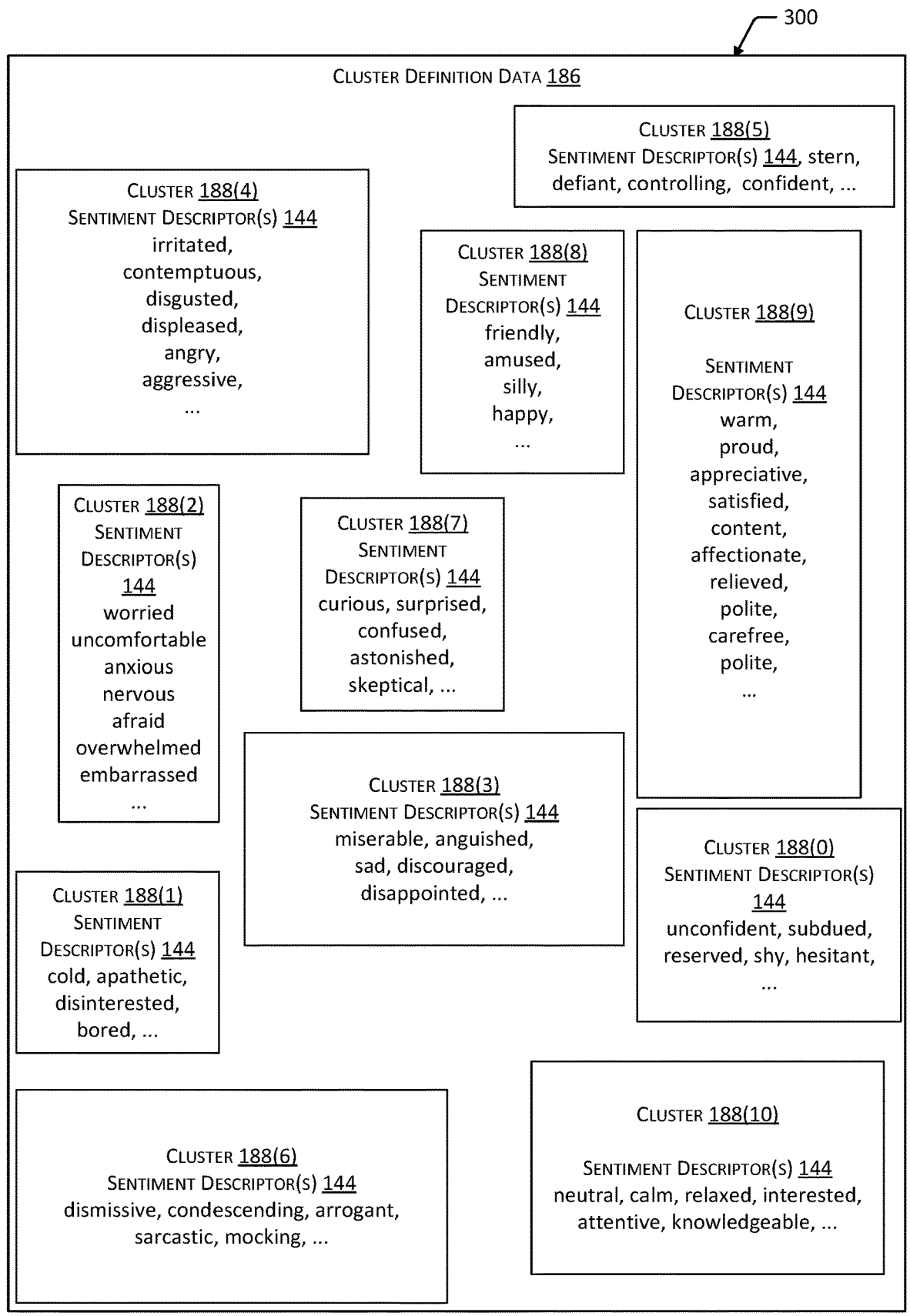
FIG. 3 illustrates cluster definition data that associates particular sentiment descriptors with respective clusters, according to one implementation.

FIG. 3 illustrates at 300 cluster definition data 186 that associates particular sentiment descriptors 144 with respective clusters 188, according to one implementation. The clusters 188 are depicted areas within a two-dimensional sentiment space. The relative location and area within the sentiment space for individual clusters 188 may vary. The clusters 188 are depicted as rectangular for clarity, and not as a limitation. For example, the boundary of a cluster 188 may comprise an irregular polygon. The sentiment space is depicted as two-dimensional for clarity and not as a limitation. For example, the sentiment space may be n-dimensional.

Figure 4:
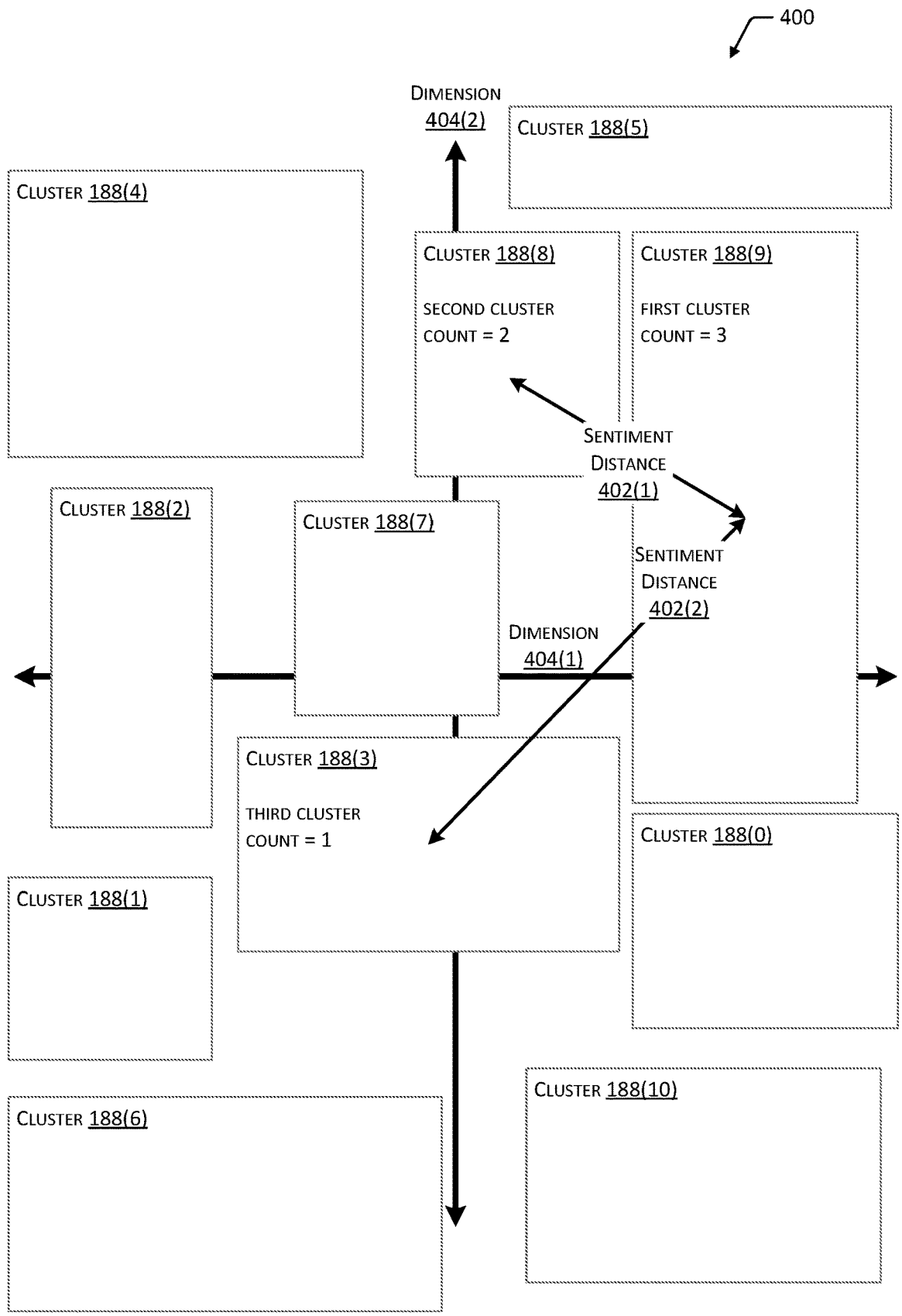
FIG. 4 illustrates the cluster counts and sentiment distances between clusters in a sentiment space, according to one implementation.

FIG. 4 illustrates at 400 the clusters 188 and the cluster metric data 156 for the first session 202(1), according to one implementation. The cluster 188(9) is associated with three utterances 208, the cluster 188(8) is associated with two utterances, and the cluster 188(3) is associated with one utterance 208. A sentiment distance 402 may be determined as the distance in the sentiment space between two clusters 188. In this illustration, the sentiment space is depicted as two-dimensional with two orthogonal dimensions 404(1) and 404(2) shown. In one implementation, the sentiment distance 402 may comprise a Euclidean distance between the center of two clusters 188. For example, as shown here, a first sentiment distance 402(1) extends from a center of the cluster 188(9) to the center of the cluster 188(8) while a second sentiment distance 402(2) extends from the center of the cluster 188(9) to the center of the cluster 188(3). In this example, the first sentiment distance 402(1) is shorter than the second sentiment distance 402(2).

In other implementations other techniques may be used to determine the sentiment distance 402. In one implementation, the sentiment distance 402 may be determined as a distance from the closest edges of two clusters 188, rather than center-to-center. In another implementation, the sentiment distance 402 may be determined as a distance from the farthest edges or maximum distance between two clusters 188. In yet another implementation, the sentiment distance 402 may be determined as an average of pairwise distances between the clusters 188 or the sentiment data 142 therein. In still another implementation, the sentiment distance 402 may comprise a rectilinear distance, or "Manhattan distance" between two clusters 188. Other distance metrics may also be used.

Figure 5:
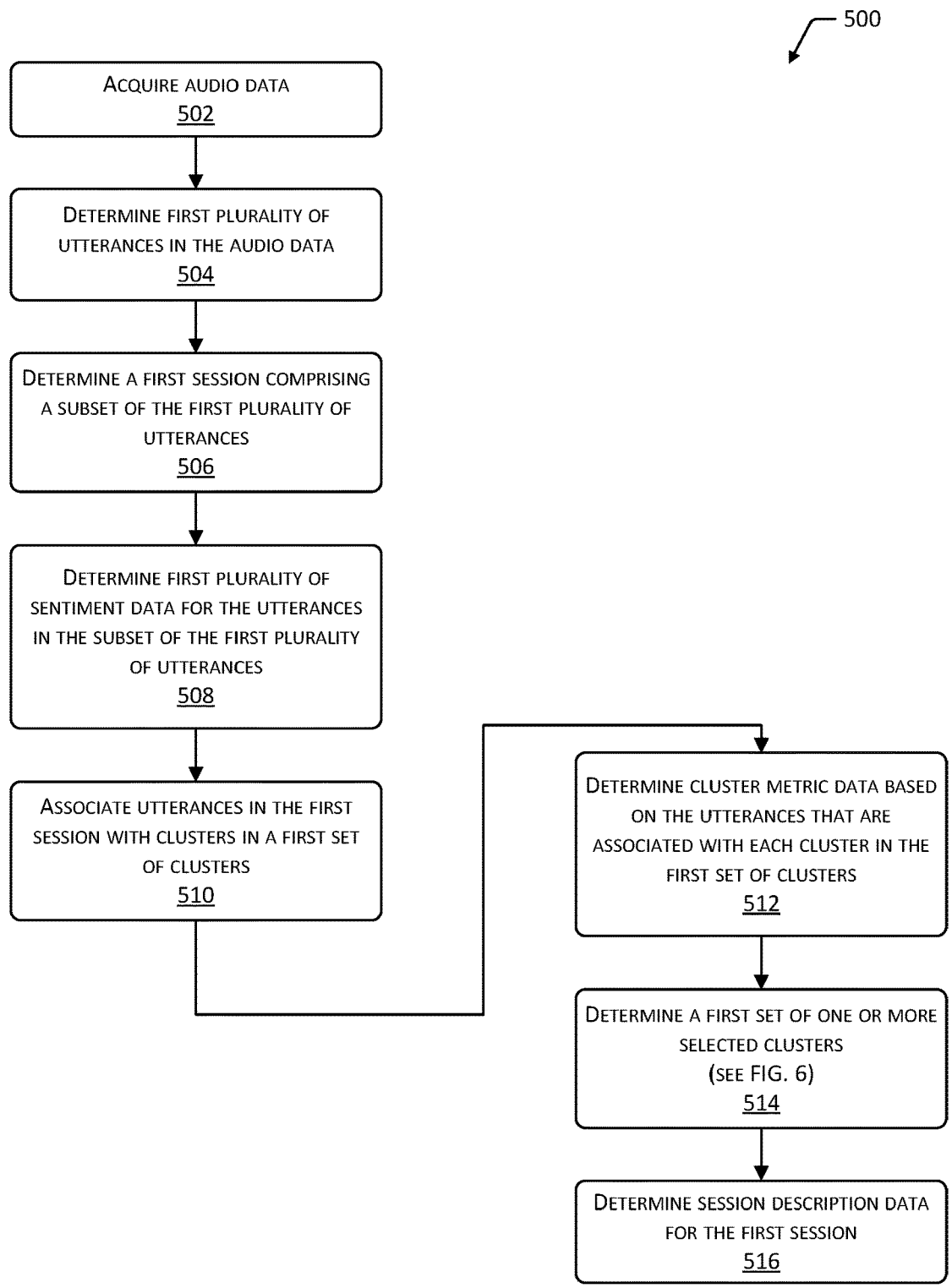
FIG. 5 is a flow diagram of a process to generate a session description for a session of speech, according to one implementation.

FIG. 5 is a flow diagram 500 of a process to generate session description data 160 for a session 212 of speech 102, according to one implementation. The process may be implemented by one or more devices, such as the computing device 106, a wearable device, a server, and so forth.

At 502, audio data is acquired. For example, raw audio data 122 may be acquired by the microphone array 120 and may be processed by the voice activity detector module 124 and audio preprocessing module 126, speech identification module 130, and so forth to generate second audio data 134.

At 504 a first plurality of utterances 208 are determined in the audio data. For example, based on data from the voice activity detector module 124, the second audio data 134 may be separated into discrete utterances 208 based on the presence or absence of voice activity. In other implementations, other techniques may be used to distinguish utterances 208. For example, the feature analysis module 140 may determine the separation between utterances 208.

At 506 a first session 212 is determined. For example, the session module 150 may be used to determine session boundary data 152. The first session 212 comprises a subset of the first plurality of utterances 208. For example, the plurality of utterances 208 may be acquired over hours, while the first session 212 comprises a 55 minute portion.

At 508, a first plurality of sentiment data 142 is determined for the utterances 208 in the subset of the first plurality of utterances 208. For example, the second audio data 134 that is associated with the first session 212 may be processed by the audio feature module 136 and the feature analysis module 140 to determine the sentiment data 142 for the utterances 208 in the first session 212.

At 510 the utterances 208 in the first session 212 are associated with clusters 188 in a first set of clusters. For example, the cluster definition data 186 may specify the first set of clusters. Continuing the example, the cluster module 154 may use the cluster definition data 186 to associate the utterances 208 in the session 212 with individual clusters 188 based on their sentiment descriptors 144.

At 512 cluster metric data 156 is determined. For example, the cluster module 154 may determine counts of utterances 208 that are associated with each cluster in the first set of clusters 188.

At 514 a first set of one or more selected clusters 188 are determined based on the cluster metric data 156. For example, the processes described with respect to FIGS. 6 and 7 may be used to select particular clusters 188 from the first set of clusters 188. Continuing the example, the selected clusters 188 may be clusters 188(9), 188(8) and 188(3).

At 516 session description data 160 is determined for the first session 212, based on the sentiment descriptors 144 associated with the one or more selected clusters 188.

Figure 6:
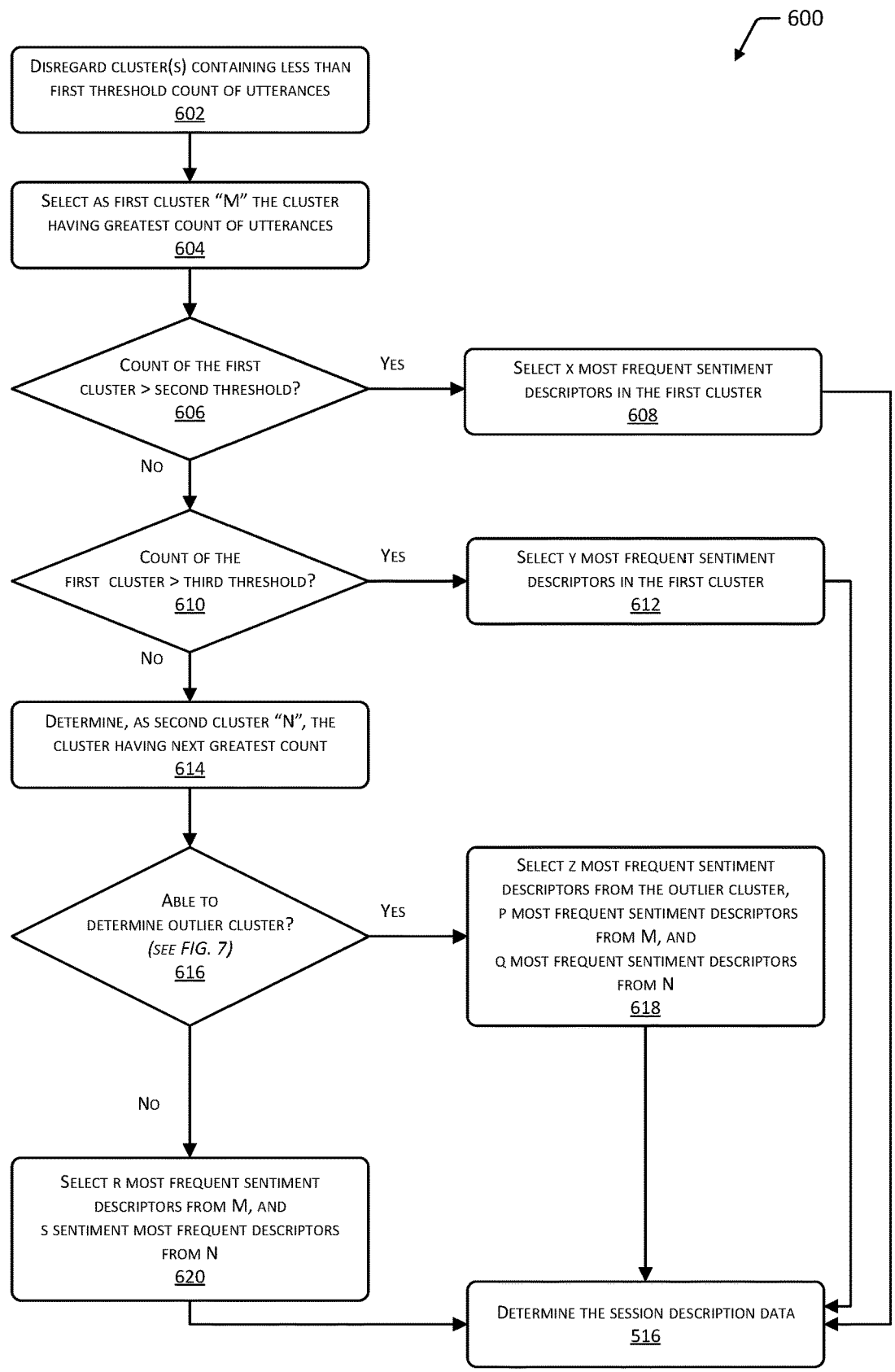
FIG. 6 is a flow diagram of a process to determine selected clusters that are associated with the session, according to one implementation.

FIG. 6 is a flow diagram 600 of a process to determine selected clusters 188 that are associated with the session 212, according to one implementation. The process may be implemented by one or more devices, such as the computing device 106, a wearable device, a server, and so forth. The process may be implemented at least in part by the session description module 158.

The following process is described with regard to cluster metric data 156 that is indicative of a count of utterances 208. While counts of utterances 208 are described, it is understood that in other implementations other metrics associated with the clusters 188 may be used.

In some situations, two or more clusters 188 may have the same values. In the determinations that follow, in the event that the metric used to compare two or more clusters 188 have the same value, a tiebreaking algorithm may be used. In one implementation, the tiebreaking algorithm may select the cluster 188 having the greatest overall duration. The duration of the cluster 188 may be calculated by summing the duration of the utterances 208 in the cluster 188. In another implementation, the tiebreaking algorithm may select the cluster 188 having the greatest number of different sentiment descriptors 144.

At 602, clusters 188 that contain less than a first threshold count of utterances 208 are disregarded from further consideration. The first threshold count may be determined based on the number of clusters. For example, where p is the number of clusters in the cluster definition data 186, those clusters 188 having a count of utterances that is less than 1/p of the total number of utterances may be disregarded.

At 604 a first cluster 188 "M" is selected based on having the greatest count of utterances 208. For example, cluster 188(9) as depicted in FIG. 4 is selected as the first cluster 188.

After selecting the first cluster 188, the remaining non-disregarded clusters 188 may be processed as described herein.

At 606 a determination is made as to whether the count associated with the first cluster 188 is greater than a second threshold. For example, the determination may be made as to whether the first cluster 188 is associated with more than a percentage threshold of all utterances 208 in the session 212. If yes, the process proceeds to 608. At 608, the top k most frequently occurring sentiment descriptors 144 are selected, where k is a nonzero positive integer. For example, the top 3 most frequently occurring sentiment descriptors 144 may be selected from the first cluster 188. These selected sentiment descriptors 144 may then be used to determine the session description data 160 at 516.

Returning to 606, if the count is not greater than a second threshold, the process proceeds to 610. At 610 a determination is made as to whether the count of the first cluster 188 is greater than a third threshold. The third threshold is less than the second threshold. For example, the determination may be made as to whether the first cluster 188 is associated with more than a second percentage threshold of all utterances 208 in the session 212. If yes, the process proceeds to 612. At 612, the top w most frequently occurring sentiment descriptors 144 are selected, where w is a nonzero positive integer. For example, the top 2 most frequently occurring sentiment descriptors 144 may be selected from the first cluster 188. These selected sentiment descriptors 144 may then be used to determine the session description data 160.

Returning to 610, if the count is not greater than the third threshold, the process proceeds to 614. At 614 a second cluster 188 "N" is determined as the cluster 188 having the next greatest count compared to the first cluster 188. For example, cluster 188(8) as depicted in FIG. 4 is selected as the second cluster 188.

At 616 a determination is made as to whether an outlier cluster is available. For example, the process described with regard to FIG. 7 may be used to determine if an outlier cluster is available. If an outlier cluster is available, the process proceeds to 618. At 618, the top z most frequently occurring sentiment descriptors 144 from the outlier cluster are selected, the top p most frequently occurring sentiment descriptors 144 from the first cluster 188 M are selected, and the top q most frequently occurring sentiment descriptors 144 from the second cluster 118 N are selected, where z, p, and q are nonzero positive integers. These selected sentiment descriptors 144 may then be used to determine the session description data 160 at 516.

Returning to 616, if no outlier cluster is deemed to be available, the process proceeds to 620. At 620, the top r most frequently occurring sentiment descriptors 144 from the first cluster 188 M are selected, and the top s most frequently occurring sentiment descriptors 144 from the second cluster 188 N are selected, where r and s are nonzero positive integers. These selected sentiment descriptors 144 may then be used to determine the session description data 160 at 516.

In the event that there are insufficient sentiment descriptors 144 available from the selected clusters 188, one or more sentiment descriptors 144 may be selected from one or more of the disregarded clusters 188 as described at 602. For example, if the session description data 160 is specified as having three sentiment descriptors 144, and only two sentiment descriptors 188 have been determined at 612, the process may select a third sentiment descriptor 144 from the disregarded cluster 188 that contains less than the first threshold count of utterances 208.

Figure 7:
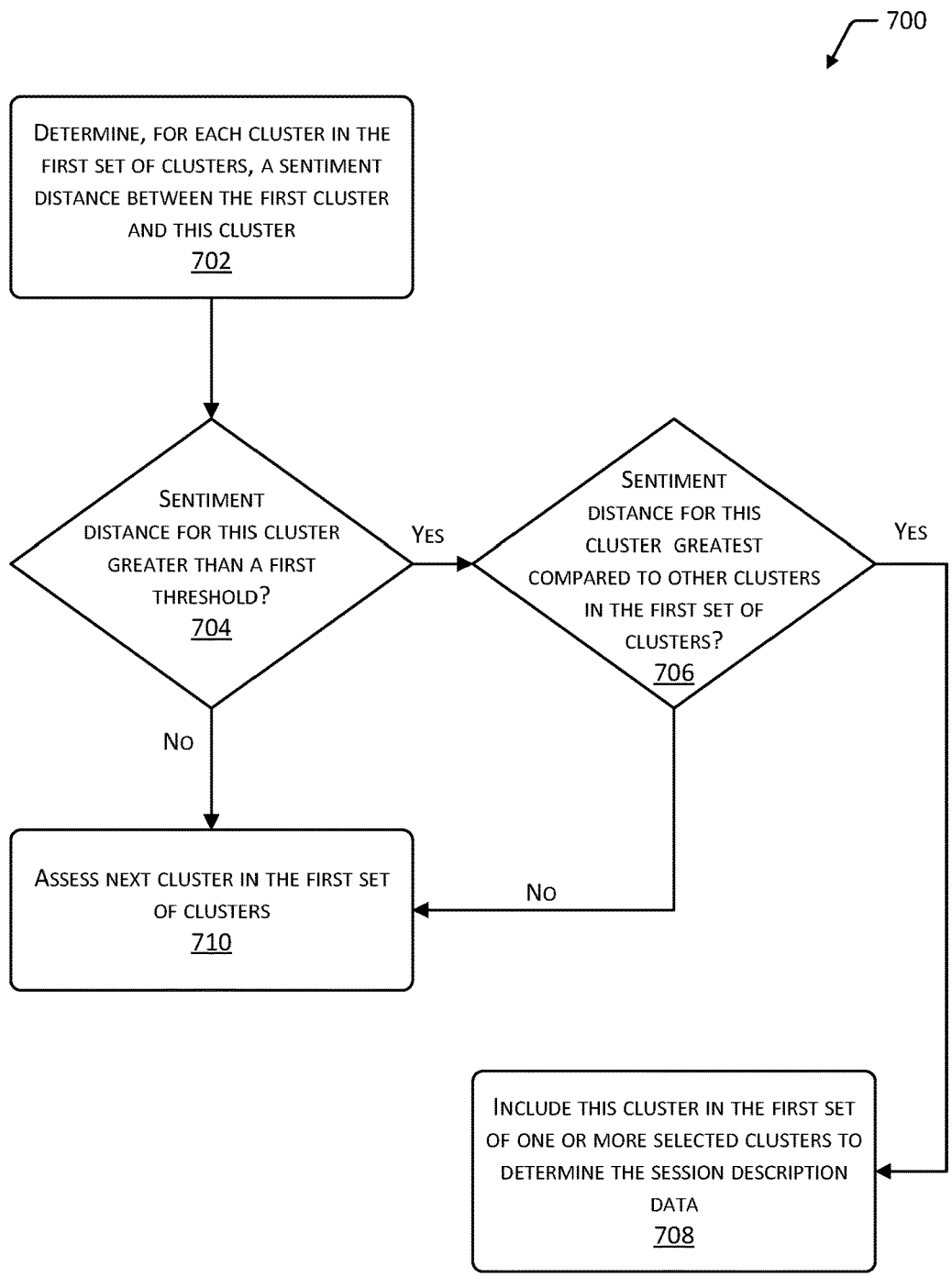
FIG. 7 is a flow diagram of a process to determine an outlier cluster for the selected clusters associated with the session, according to one implementation.

FIG. 7 is a flow diagram 700 of a process to determine availability of an outlier cluster for the selected clusters 188 associated with the session 212, according to one implementation. The process may be implemented by one or more devices, such as the computing device 106, a wearable device, a server, and so forth.

The following process may iterate through the first set of clusters 188. The first set of clusters 188 may comprise those clusters 188 that contain more than a first threshold count of utterances 208. The first threshold count may be determined based on the number of clusters 188. For example, where p is the number of clusters 188 in the cluster definition data 186, those clusters 188 considered using this process may be limited to those having a count of utterances 208 that is greater than 1/p of the total number of utterances 208.

At 702, for each cluster 188 in the first set of clusters, a sentiment distance 402 is determined between the first cluster 188 M and a third cluster 188 (or other cluster 188 being processed during the iteration through the first set of clusters 188). As discussed with regard to FIG. 4, the sentiment distance 402 may comprise a distance within a sentiment space. For example, the sentiment distance 402 may comprise a Euclidean distance between a center of the first cluster 188 and the third cluster 188.

At 704 a determination is made as to whether the sentiment distance 402 for the third cluster 188 is greater than a first threshold distance. For example, sentiment distances of less than the first threshold distance may be deemed too similar to the first cluster 188 to be outliers. If yes, the process proceeds to 706.

At 706, a determination is made as to whether the sentiment distance 402 for the third cluster 188 is greatest compared to the sentiment distances 402 for other clusters 188 in the first set of clusters 188. For example, the process is determining if the sentiment distance 402 between the first cluster 188 M and the cluster 188 being assessed is the greatest sentiment distance 402. If yes, the process proceeds to 708. At 708, the third cluster 188 is selected and included in the first set of one or more selected clusters 188. The sentiment data 142 associated with the selected third cluster 188 may then be used to determine the session description data 160.

Returning to 704, if no, the process proceeds to 710. At 710, the next cluster 188 in the first set of clusters 188 is assessed.

Returning to 706, if no, the process proceeds to 710. At 710, the next cluster 118 in the first set of clusters 118 is assessed.

Figure 8:
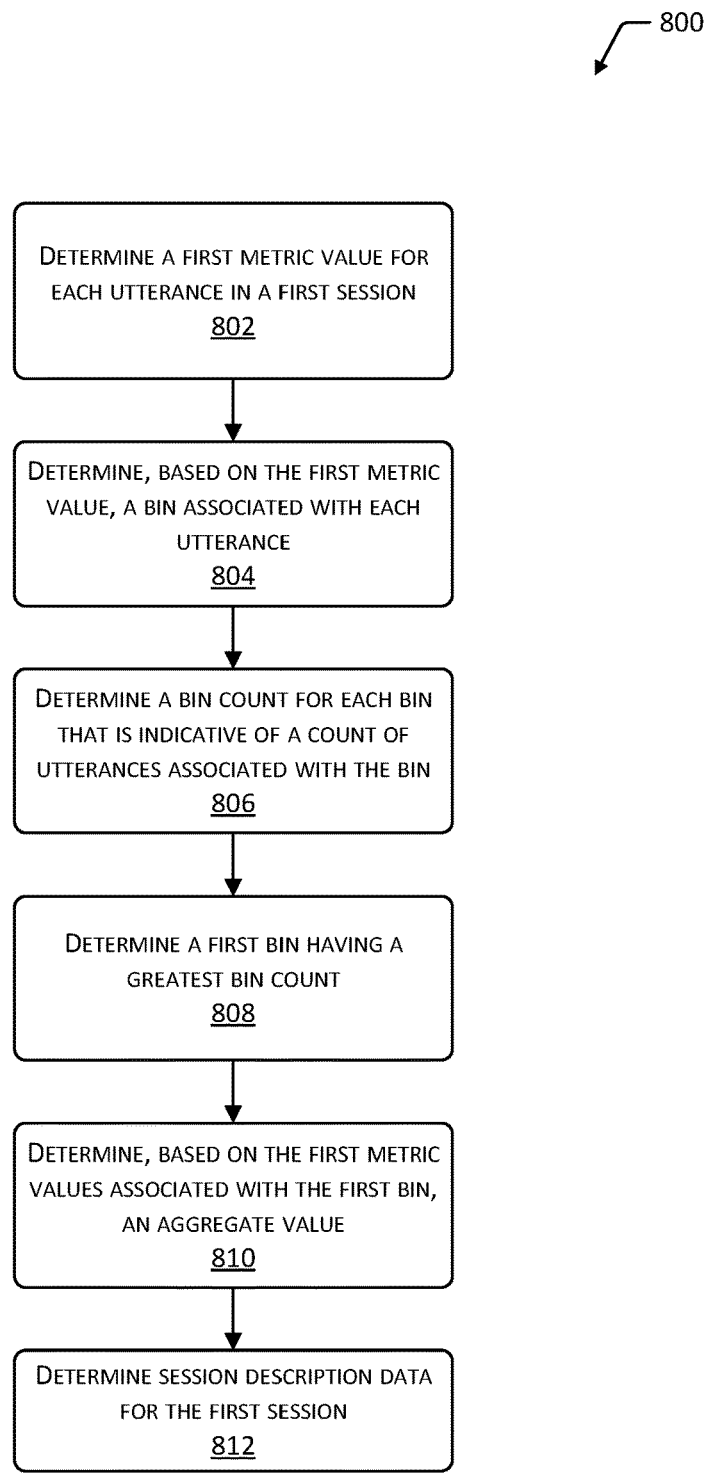
FIG. 8 is a flow diagram of a process to determine an aggregate metric value for a session, according to one implementation.

FIG. 8 is a flow diagram 800 of a process to determine an aggregate metric value for a session, according to one implementation. The process may be implemented by one or more devices, such as the computing device 106, a wearable device, a server, and so forth. The process may be implemented at least in part by the session description module 158.

At 802, one or more metric values 146 are determined for a plurality of utterances 208 in a first session 212. For example, for each utterance 208 in the first session 212, an activation metric value and a valence metric value may be determined.

At 804, based on the first metric value 208, a bin is associated with each utterance 208. For example, two-dimensional bins may be used in which each bin is associated with a first range of activation values and a second range of valence values.

At 806 a bin count is determined for each bin that is indicative of a count of utterances 208 associated with the bin.

At 808 a first bin having a greatest bin count is determined. If a plurality of bins have the same bin count value, the bin associated with the greatest duration of utterances 208 may be selected.

At 810, based on the one or more metric values 146 associated with the first bin, one or more aggregate values is determined. For example, a first aggregate value may comprise an average of the activation values in the first bin. Continuing the example, a second aggregate value may comprise an average of the valence values in the first bin.

At 812, session description data 160 for the first session 212 is determined based at least in part on the aggregate values.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
   at least one hardware processor that executes instructions to:
   receive first audio data of a user, wherein the first audio data is acquired from a first time to a second time;
   determine a first plurality of utterances in the first audio data, wherein each utterance comprises speech by the user having pauses that are less than a threshold time;
   determine a first session comprising a subset of the first plurality of utterances acquired between a third time and a fourth time, wherein the third time and the fourth time are within the first time and the second time;
   determine, for the utterances in the first session, a first plurality of sentiment data;
   based on the first plurality of sentiment data, associate each utterance in the first session with one cluster in a first set of clusters;
   determine counts of utterances associated with each cluster in the first set of clusters;
   determine, based on the counts, a first cluster having a greatest count of utterances;
   determine, based on the counts, a second cluster having a next greatest count of utterances;
   determine, based on the counts, an outlier cluster;
   determine a session description based on the first cluster, the second cluster, and the outlier cluster; and
   present the session description in a user interface.

2. The device of claim 1, the instructions to determine the first session comprising instructions to one or more of:
   receive input indicative of the user starting the first session at the third time and ending the first session at the fourth time,
   determine the user was present at a first location between the third time and the fourth time,
   determine, based on appointment data associated with the user, the third time based on a start of a scheduled appointment and the fourth time based on an end of the scheduled appointment,
   determine one or more of the third time or the fourth time based on an absence of an utterance in the first audio data for a first threshold interval, or
   determine the user was proximate to a second user beginning at the third time and the user was no longer proximate to the second user at the fourth time.

3. The device of claim 1, the instructions to determine the first cluster further comprising instructions to:
   determine a second set of clusters comprising the first set of clusters and excluding the first cluster, wherein each cluster in the second set of clusters has a count of utterances that exceeds a first threshold value;
   determine a sentiment distance between the first cluster and each cluster in the second set of clusters; and
   determine, based on a greatest sentiment distance, the outlier cluster from the second set of clusters.

4. A system comprising at least one hardware processor that executes instructions to:
   receive first audio data that is associated with a user;
   determine a first plurality of utterances in the first audio data;
   determine a first session comprising a subset of the first plurality of utterances acquired between a first time and a second time;
   determine, for at least a portion of the utterances in the first session, a first plurality of sentiment data;
   based on the first plurality of sentiment data, associate each utterance in the first session with one cluster in a first set of clusters;
   determine counts of utterances that are associated with each cluster in the first set of clusters;

determine, based at least in part on the counts, a first set of one or more selected clusters;
determine, based on the first set of one or more selected clusters, a session description; and
generate user interface data to cause presentation of the session description in a user interface.

5. The system of claim 4, the instructions to determine the first plurality of utterances further comprising instructions to:
determine, using a voice activity detector, speech in the first audio data;
determine a third time and a fourth time within which the speech is separated by intervals of non-speech that are less in duration than a first threshold time; and
determine the fourth time and a fifth time are separated by an interval of non-speech that exceeds a second threshold time, wherein a first utterance comprises a portion of the first audio data between the third time and the fourth time.

6. The system of claim 4, the instructions to determine the first session comprising instructions to one or more of:
receive input indicative of the user starting the first session at the first time and ending the first session at the second time,
determine the user was present at a first location between the first time and the second time,
determine the first time and the second time based on appointment data associated with the user, wherein the first time is associated with a start of a scheduled appointment and the second time is associated with an end of the scheduled appointment,
determine one or more of the first time or the second time based on an absence of an utterance in the first audio data for a first threshold interval, or
determine the user was proximate to a second user beginning at the first time and the user was no longer proximate to the second user at the second time.

7. The system of claim 4, the instructions to determine the first set of one or more selected clusters comprising instructions to:
determine each cluster in the first set of clusters that has a count of utterances that is greater than a threshold value.

8. The system of claim 4, the instructions to determine the first set of one or more selected clusters comprising instructions to:
determine, based on the counts, a first cluster having a greatest count of utterances.

9. The system of claim 4, the instructions to determine the first set of one or more selected clusters comprising instructions to:
determine that a count of a first cluster has a first value;
determine that a count of a second cluster has the first value;
determine a first total duration of the utterances in the first cluster;
determine a second total duration of the utterances in the second cluster; and
select, based on the first total duration being greater than the second total duration, the first cluster as part of the first set of one or more selected clusters.

10. The system of claim 4, the instructions to determine the first set of one or more selected clusters comprising instructions to:
determine, based on the counts, a first cluster having a greatest count of utterances; and
determine that a count of the first cluster exceeds a percentage threshold of a total count of all utterances; and
the instructions to determine the session description comprising instructions to:
determine, based on the first plurality of sentiment data for the utterances in the first cluster, a first set of sentiment descriptors;
determine, based on a frequency of occurrence of each sentiment descriptor in the first set of sentiment descriptors, a set of most frequent descriptors; and
determine the session description based on the set of most frequent descriptors.

11. The system of claim 4, the instructions to determine the first set of one or more selected clusters comprising instructions to:
determine, based on the counts, a first cluster having a greatest count of utterances;
determine a second set of clusters comprising the first set of clusters and excluding the first cluster, wherein each cluster in the second set of clusters has a count of utterances that exceeds a first threshold value;
determine a sentiment distance between the first cluster and each cluster in the second set of clusters; and
determine, based on a greatest sentiment distance that is also greater than a second threshold value, an outlier cluster from the second set of clusters; and
wherein the first set of one or more selected clusters includes the outlier cluster.

12. The system of claim 4, the instructions to determine the first set of one or more selected clusters comprising instructions to:
determine, based on the counts, a first cluster having a greatest count of utterances;
determine a second set of clusters comprising the first set of clusters and excluding the first cluster, wherein each cluster in the second set of clusters has a count of utterances that exceeds a first threshold value;
determine a sentiment distance between the first cluster and each cluster in the second set of clusters; and
wherein the first set of one or more selected clusters includes:
the first cluster, and
one or more of the second set of clusters based on their respective sentiment distances.

13. The system of claim 4, further comprising instructions to:
determine a first metric value for each utterance;
determine, based on the first metric value, a bin associated with each utterance;
determine, for each bin, a bin count indicative of a count of utterances associated with the bin;
determine a first bin having a greatest count of utterances associated with that bin;
determine, based on the first metric values associated with the first bin, an aggregate value; and
wherein the session description is based at least in part on the aggregate value.

14. A method comprising:
receiving first audio data that is associated with a user;
determining a first plurality of utterances in the first audio data;
determining a first session comprising a subset of the first plurality of utterances acquired between a first time and a second time;

determining, for at least a portion of the first plurality of utterances in the first session, a first plurality of sentiment data;

based on the first plurality of sentiment data, associating each utterance in the first session with one cluster in a first set of clusters;

determining counts of utterances that are associated with each cluster in the first set of clusters;

determining, based at least in part on the counts, a first set of one or more selected clusters;

determining, based on the first set of one or more selected clusters, a session description; and generating user interface data to cause presentation of the session description in a user interface.

15. The method of claim 14, the determining the first plurality of utterances further comprising:

determining, using a voice activity detector, speech in the first audio data;

determining a third time and a fourth time within which the speech is separated by intervals of non-speech that are less in duration than a first threshold time; and determining the fourth time and a fifth time are separated by an interval of non-speech that exceeds a second threshold time, wherein a first utterance comprises a portion of the first audio data between the third time and the fourth time.

16. The method of claim 14, the determining the first session comprising one or more of:

receiving input indicative of the user starting the first session at the first time and ending the first session at the second time, determining the user was present at a first location between the first time and the second time, determining the first time and the second time based on appointment data associated with the user, wherein the first time is associated with a start of a scheduled appointment and the second time is associated with an end of the scheduled appointment, determining one or more of the first time or the second time based on an absence of an utterance in the first audio data for a first threshold interval, or determining the user was proximate to a second user beginning at the first time and the user was no longer proximate to the second user at the second time.

17. The method of claim 14, the determining the first set of one or more selected clusters comprising:

determining each cluster in the first set of clusters that has a count of utterances that is greater than a threshold value.

18. The method of claim 14, the determining the first set of one or more selected clusters comprising:

determining, based on the counts, a first cluster having a greatest count of utterances.

19. The method of claim 14, the determining the first set of one or more selected clusters comprising:

determining that a first count of a first cluster is equal to a second count of a second cluster;

determining a first total duration of the utterances in the first cluster;

determining a second total duration of the utterances in the second cluster; and selecting, based on the first total duration being greater than the second total duration, the first cluster as part of the first set of one or more selected clusters.

20. The method of claim 14, the determining the first set of one or more selected clusters comprising:

determining, based on the counts, a first cluster having a greatest count of utterances; and determining that a count of the first cluster exceeds a percentage threshold of a total count of all utterances; and the determining the session description comprising:

determining, based on the first plurality of sentiment data for the utterances in the first cluster, a first set of sentiment descriptors;

determining, based on a frequency of occurrence of each sentiment descriptor in the first set of sentiment descriptors, a set of most frequent descriptors; and determining the session description based on the set of most frequent descriptors.

21. The method of claim 14, the determining the first set of one or more selected clusters comprising:

determining, based on the counts, a first cluster having a greatest count of utterances;

determining a second set of clusters comprising the first set of clusters and excluding the first cluster, wherein each cluster in the second set of clusters has a count of utterances that exceeds a first threshold value;

determining a sentiment distance between the first cluster and each cluster in the second set of clusters; and determining, based on a greatest sentiment distance that is also greater than a second threshold value, an outlier cluster from the second set of clusters; and wherein the first set of one or more selected clusters includes the outlier cluster.

22. The method of claim 14, the determining the first set of one or more selected clusters comprising:

determining, based on the counts, a first cluster having a greatest count of utterances;

determining a second set of clusters comprising the first set of clusters and excluding the first cluster, wherein each cluster in the second set of clusters has a count of utterances that exceeds a first threshold value;

determining a sentiment distance between the first cluster and each cluster in the second set of clusters; and wherein the first set of one or more selected clusters includes:

the first cluster, and one or more of the second set of clusters based on respective sentiment distances.

23. The method of claim 14, further comprising:

determining a first metric value for each utterance;

determining, based on the first metric value, a bin associated with each utterance;

determining, for each bin, a bin count indicative of a count of utterances associated with the bin;

determining a first bin having a greatest count of utterances associated with that bin;

determining, based on the first metric values associated with the first bin, an aggregate value; and wherein the session description is based at least in part on the aggregate value.

* * * * *